July 7, 1964 E. F. SCHREINER 3,139,924
INTERNAL COMBUSTION ENGINE DRIVEN HEAT PUMP
Filed Dec. 8, 1960 2 Sheets-Sheet 1

INVENTOR
EARL F. SCHREINER
BY
ATTORNEY

July 7, 1964 E. F. SCHREINER 3,139,924
INTERNAL COMBUSTION ENGINE DRIVEN HEAT PUMP
Filed Dec. 8, 1960 2 Sheets-Sheet 2

INVENTOR
EARL F. SCHREINER
BY
ATTORNEY 3,139,924
INTERNAL COMBUSTION ENGINE DRIVEN HEAT PUMP
Earl F. Schreiner, St. Petersburg, Fla., assignor to I.C.E.D. Incorporated, St. Petersburg, Fla., a corporation of Florida
Filed Dec. 8, 1960, Ser. No. 74,656
8 Claims. (Cl. 165—29)

The present invention relates to an improvement in internal combustion engine driven refrigerating systems of the compressor-condenser-expander reverse-cycle type arranged to selectively heat or cool a space, such as a room.

The principal object of the present invention is the provision of an internal combustion engine driven refrigerating system of the reverse cycle compressor-condenser-expander type, utilized to alternatively heat or cool a space by reversal of the order of flow of refrigerant through heat exchangers which serve alternatively as the condenser or evaporator of the system, in which the engine, compressor, a first heat exchanger and heat dissipater of the engine cooling system are located within a housing having means to move outdoor air in opposite directions through the housing according to whether the system is in its cooling or heating phase to effect maximum cooling of the heat exchanger when it functions as a condenser during the cooling phase and to impart substantially the entire heat of the internal combustion engine and compressor to the exchanger during the heating phase when the exchanger functions as an evaporator, the components of the system in the housing being so arranged in the path of air flow that merely the reversal in direction of air flow through the housing affects the cooling and heating of the heat exchanger mentioned for maximum efficiency of the system.

Other objects and advantages of the invention will be apparent from the following description of a preferred form thereof, reference being made to the accompanying drawings, wherein:

FIG. 1 is a schematic plan view, partly in section, of a compressor-condenser-expander type heating and cooling system for a room or the like;

Figure 1:
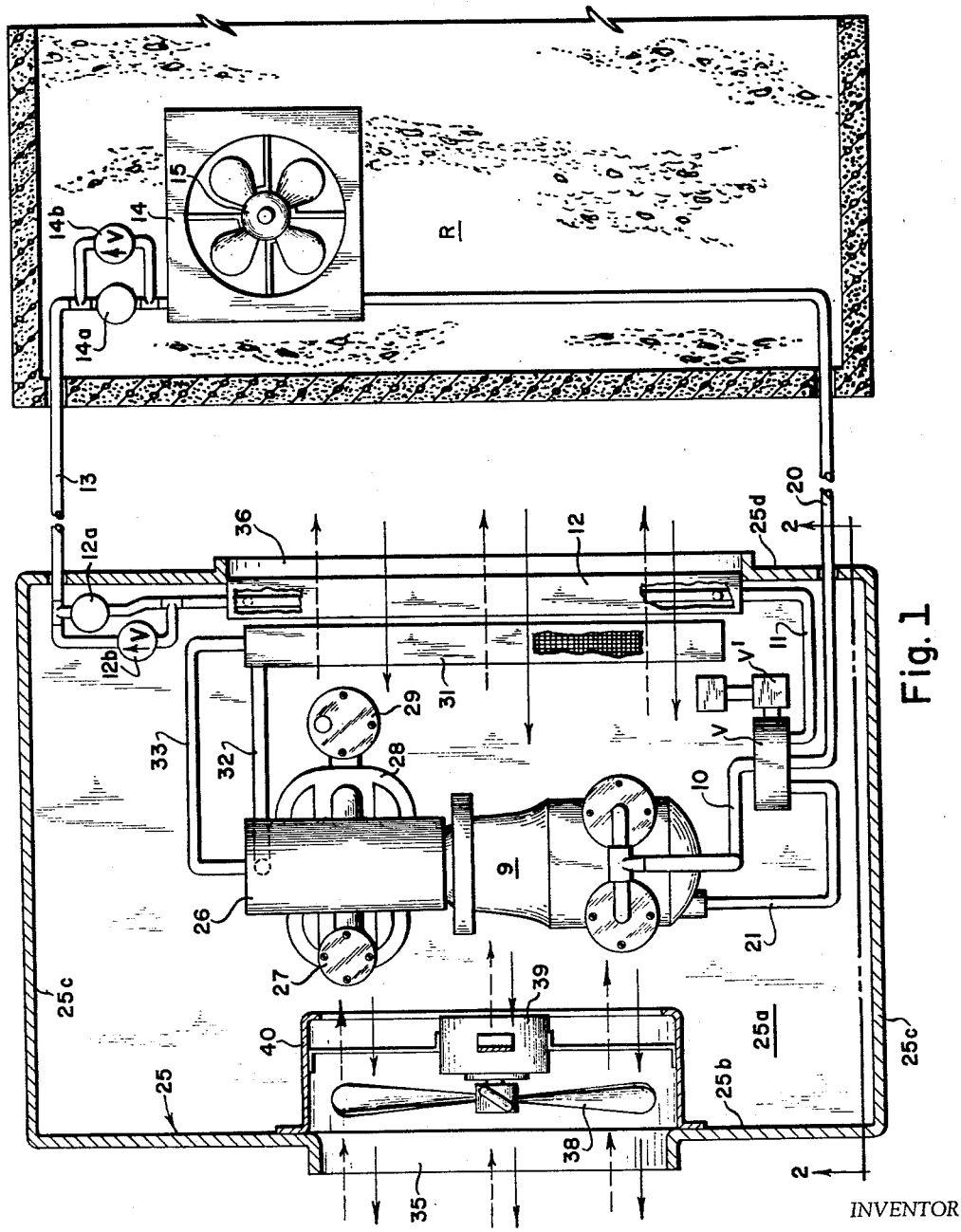

In the form of the invention shown in the drawings an internal combustion engine driven reverse cycle refrigerating system is arranged to heat and cool a room indicated generally at R. The refrigerating system comprises a compressor 9 having its discharge connected by a pipe 10 to a reversing valve V which, when in one of its operative positions, directs the discharge of high pressure refrigerant through a pipe 11 to the inlet of an "outside" heat exchanger 12, which is of a conventional type comprising coiled or serpentine arranged tubes with fins attached thereto and between which air is passed to effect heat exchange with the walls of the tube. The exchanger serves as a condenser during the cooling cycle or phase of operation of the system and as an evaporator during the heating phase of operation of the system.

The outlet of exchanger 12 includes a check valve 12a which bypasses an expansion valve 12b and which is connected by pipe 13 to one end of an "inside" heat exchanger 14 which is similar to exchanger 12, except for configuration, and which serves as an evaporator during the cooling phase of the system and as a condenser during the heating phase, as is more clearly explained hereinafter. Check valve 12a functions to force refrigerant flowing to exchanger 12 through pipe 13 to pass through expansion valve 12b so that exchanger 12 will function as an evaporator in such case, as is discussed hereinafter.

Exchanger 14 is located in room R, and a fan 15 forces air over the surfaces thereof to effect rapid heat exchange between the walls thereof and the air of the room. An expansion valve 14a is connected between pipe 13 and the upper end of exchanger 14 to restrict the flow of refrigerant thereinto so that a high refrigerant condensing pressure is developed in exchanger 12 to cause condensation of refrigerant therein and the condensed refrigerant enters exchanger 14 through the expansion valve and evaporates to cool the exchanger during the cooling cycle, as is well understood in the art. Evaporated refrigerant is withdrawn from exchanger 14 through pipe 20 to valve V and back to the intake of the compressor through pipe 21.

A bypass pipe is arranged around expansion valve 14a and includes a check valve 14b therein which forces refrigerant flowing to exchanger 14 through pipe 13 to pass through the expansion valve but which permits free flow of refrigerant round the expansion valve when the flow of refrigerant is reversed to flow from exchanger 14 to exchanger 12 through pipe 13. During this reverse flow, check valve 12a closes and forces the refrigerant to enter exchanger 12 through expansion valve 12b, the restriction of which causes pressure to build in exchanger 14 and condense the refrigerant therein and to cause the condensed refrigerant to enter and be vaporized in exchanger 12.

The components of the reverse cycle refrigerating system described may be of suitable conventional designs, and the compressor 9, reversing valve V and exchanger 12 are enclosed in a housing 25 which may be located at any convenient position outside of room R.

Valve V is capable of reversing the order of flow of refrigerant from the discharge of compressor 9 through the exchangers 12 and 14 according to the energization and deenergization of a solenoid V' which is effective when deenergized to cause valve V to direct refrigerant from pipe 10 through pipe 11, outdoor exchanger 12, pipe 13, and through inside exchanger 14, from whence it is returned to the condenser, whereby a cooling phase is produced in the inside exchanger for cooling the air of room R, as described hereinbefore. When solenoid V' is energized, valve V is operative to direct the discharge refrigerant from pipe 10 through pipe 20 to inside exchanger 14, through pipe 13 back to outdoor exchanger 12, thence through pipe 11 and valve V back to pipe 21 and to the suction side of the compressor. Thus, inside exchanger 14 becomes the condenser and the heat of compression of the refrigerant is transferred to room air passing over the surfaces thereof while outdoor exchanger 12 serves as the evaporator of the refrigerating system and absorbs heat from the surrounding air to vaporize the refrigerant fed therethrough through line 13. By this arrangement it will be seen that during the cooling phase it is desirable to cause maximum cooling efficiency of outdoor exchanger 12, whereas during the heating phase it is advantageous to cause the outdoor exchanger to absorb as much heat as possible.

Compressor 9 is driven by a conventional internal combustion engine 26 located adjacent thereto and inside housing 25 and which is connected with a suitable source of fuel supply, not shown, such as natural gas, bottled gas or gasoline. The engine includes the usual carburetor 27 and exhaust manifold 28 discharging into a muffler 29 which in turn discharges into housing 25. Preferably, engine 26 is liquid cooled and includes an air cooled radiator 31 located adjacent to exchanger 12, on the inside thereof relative to the wall 25a of housing 25 so that air passes therethrough to carry away the heat of the engine coolant circulated therein. The coolant is pumped from the engine block to the radiator through pipe 32 and returned from the radiator to the engine through pipe 33 by the usual pumping means, not shown.

Although automatic controls are generally employed for starting and stopping engine 26 under proper conditions, they are not shown because such controls are well known and do not necessarily enter into the present invention.

Housing 25 includes a bottom wall 25a, front wall 25b, two side walls 25c, rear wall 25d and top wall 25e. Engine 26 and compressor 9 rest on bottom wall 25a, which is supported above a suitable base structure by blocks 34. Front and rear walls 25b and 25d have air openings 35 and 36 therethrough, and a fan 38 is driven by a reversible electric motor 39 selectively in opposite directions to either cause a flow of air through opening 35 and out opening 36, or vice versa. Motor 39 may be of conventional design, including two windings 39a and 39b arranged to be alternatively energized to cause the motor rotor to be driven in opposite directions. When winding 39a is energized fan 38 is driven in a direction to move air from right to left, as indicated by full line arrows, and when winding 39b is energized, the fan is driven in the opposite direction to move the air as indicated by the dotted arrows. The fan and motor are supported by a bracket 40 attached to wall 25b. Exchanger 12 and radiator 31 are located in alignment with the edges of opening 36 so that substantially the total volume of air moved through the housing by fan 38 passes in heat exchange relation with the exchanger and radiator and also flows in a path which directs it about compressor 9 and engine 26, including the exhaust manifold 28 and muffler 29. It will be noted that when air enters housing 25 through opening 36 and is exhausted through opening 35, it passes initially over exchanger 12, then through radiator 31, and when the direction of fan 38 is reversed, air enters opening 35, passes over the engine and compressor, thence through radiator 31 and finally through exchanger 12 and out opening 36.

My invention comprises providing means by which motor 39 is reversed to drive fan 38 in accordance with the energization and deenergization of solenoid V' so that during the cooling phase, i.e.: when solenoid V' is deenergized, the fan is driven in a direction to move air first into opening 36, through exchanger 12 and radiator 31, and then out opening 35. When solenoid V' is energized to establish a heating cycle, motor 39 is reversed to cause air to be drawn into housing 25 through opening 35, over engine 26 and compressor 9 absorbing heat therefrom, through radiator 31, where additional heat is absorbed from the engine coolant passing through the radiator, and thence through exchanger 12 and out opening 36. This flow of air through housing 25 directs substantially all heat from engine 26 and compressor 9 to exchanger 12, effecting evaporation of the liquid refrigerant therein so that ample gaseous refrigerant is always available for compression by the compressor and the heat generated by compression and condensation of refrigerant in exchanger 14 produces a maximum amount of heat for dissipation into the room R. Furthermore, the heat from the internal combustion engine and the compressor substantially reduces or eliminates the likelihood of ice forming on the surfaces of outdoor exchanger 12 during the heating cycle.

Figure 3:
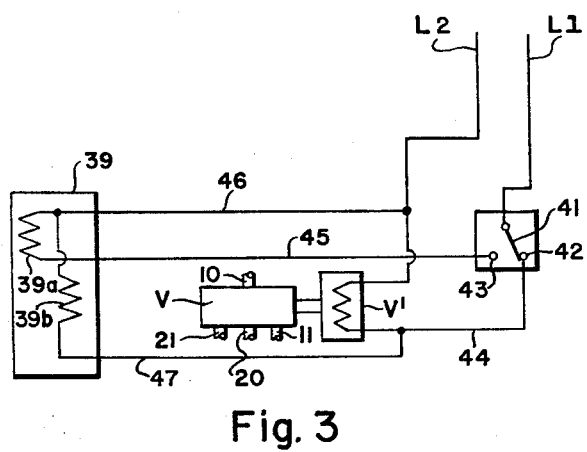
FIG. 3 is a schematic wiring diagram of certain components of the system.

Means for controlling the direction of motor 39 is shown diagrammatically in FIG. 3, and comprises a conventional switch having a pivoted contact 41, which may be manually or thermostatically operated to swing to a fixed contact 42 when it is desired to effect a heating cycle in the room R and to swing to a second contact 43 when it is desired to produce a cooling cycle. The pivoted end of contact 41 is connected with L1 of a suitable two wire electric supply line. Contact 42 is connected by a wire 44 with one terminal of solenoid V', the other terminal of the solenoid being connected to L2 of the power line.

Contact 43 is connected by wire 45 to one lead of motor winding 39a, the other lead of which winding is connected to line L2 through wire 46. One lead of winding 39b is connected to wire 44 by wire 47 and the ohter lead of the winding is connected to wire 46.

Figure 2:
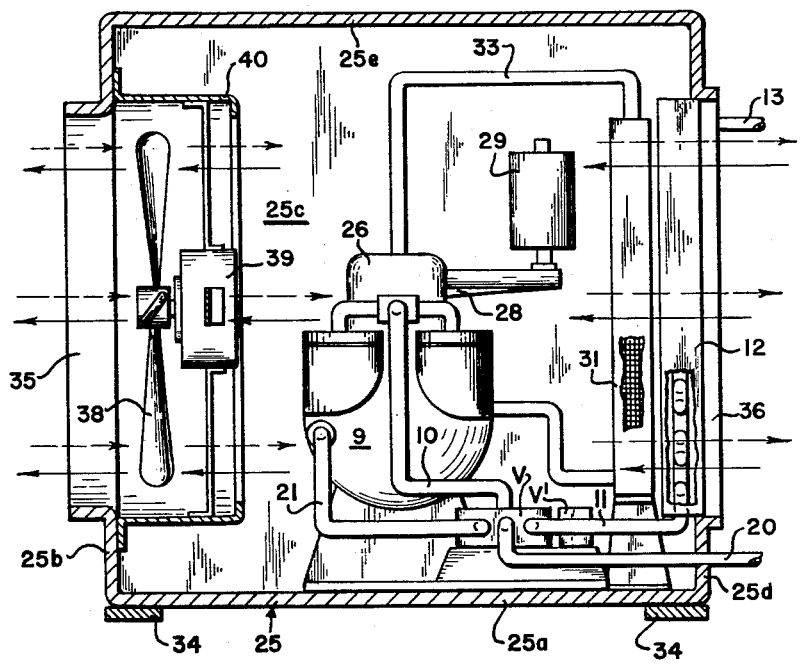
FIG. 2 is a view taken on line 2—2 of FIG. 1.

Contact 41 is moved to engage contact 43 to effect a cooling cycle and in this event the circuit for solenoid V' is open at contact 42, as is the circuit for coil 39b, and winding 39a of motor 39 is energized by a circuit including line L1, contacts 41, 43, wire 45 to one side of winding 39, and wire 46 to line L2, so that motor 39 then drives fan 38 to move the air through housing 25 in the direction indicated by the full line arrows of FIGS. 1 and 2. To effect a heating cycle or phase, contact 41 is shifted from contact 43 to 42, which opens the circuit for winding 39a and closes the circuits for solenoid V' and winding 39b, thereby effecting reversal of the flow of refrigerant through exchangers 12 and 14, as described previously, and also reversing the direction of fan 38 to cause air flow through housing 25 in the direction indicated by the broken arrows in FIGS. 1 and 2. Thus, the direction of flow of refrigerant through exchangers 12 and 14 is synchronized with the direction of drive of fan 38.

While I have described but one form of the invention, it is to be understood that other forms, modifications and adaptations could be made, all falling within the scope of the claims which follow.

I claim:

1. In a refrigerating system including a refrigerant compressor, first and second heat exchangers connected with said compressor in a refrigerant circuit and adapted to serve either as a condenser or evaporator, an engine for driving said compressor, valve means to selectively reverse the order of flow of refrigerant from the discharge of said compressor through said first and second heat exchangers whereby one exchanger serves as a refrigerant condenser while the other exchanger serves as a refrigerant evaporator and vice versa, means forming an air flow path including therein said compressor, engine and said first heat exchanger, said first exchanger being at one end of said path, and means for forcing air selectively in opposite directions through said path whereby air may be passed through said path in one direction to initially flow over said first exchanger when said first exchanger is operating as a condenser and to reverse the direction of air flow through said path when said first exchanger is operating as an evaporator.

2. A refrigerating system as defined in claim 1 in which said engine comprises an internal combustion engine and including a heat dissipating means comprising a heat dissipating radiator in said air flow path adjacent to said first exchanger and between said first exchanger and engine.

3. A refrigerating system as defined in claim 1 including common control means for said valve means and said means for forcing air through said path whereby the directional functions of the last two mentioned means are synchronized whereby air is passed through said path in a direction to initially flow over said first exchanger when said first exchanger is operating as a condenser and to reverse the direction of flow of air through said path when said first exchanger is operating as an evaporator.

4. In a refrigerating system including a refrigerant compressor, first and second heat exchangers connected with said compressor in a refrigerating circuit and adapted to serve either as a condenser or evaporator, an engine for driving said compressor valve means to reverse the order of flow from the discharge of said compressor through said first and second heat exchangers whereby said first exchanger serves as a refrigerant condenser while said second exchanger serves as a refrigerant evaporator and vice versa, a housing enclosing said compressor, engine and first heat exchanger, said housing having two spaced openings therein for providing flow of air therethrough, said first heat exchanger being adjacent to and extending transversely of one of said openings, whereby substantially all air entering or leaving said housing through said one opening passes through said first exchanger, and reversible fan means for forcing air into one of said openings and out the other or vice versa whereby air may be drawn into said housing through said one opening when said first exchanger operates as a condenser and drawn into said housing through the other of said openings and outwardly through said one opening when said first exchanger is operating as an evaporator.

5. In a refrigerating system of the character defined in claim 4 in which said engine is an internal combustion type having a heat dissipating system including a radiator disposed in said housing adjacent to said first exchanger.

6. In a refrigerating system including a refrigerant compressor, first and second heat exchangers connected with said compressor in a refrigerating circuit and adapted to serve either as a condenser or evaporator depending upon the order of flow of refrigerant therethrough, an engine for driving said compressor, electrically controlled valve means to reverse the order of flow from the discharge of said compressor through said first and second heat exchangers whereby one exchanger serves as a refrigerant condenser while the other exchanger serves as a refrigerant evaporator and vice versa, a housing enclosing said compressor, engine and first heat exchanger, said housing having two spaced openings therein for providing flow of air therethrough, said first heat exchanger extending transversely of said one opening whereby substantially all air entering or leaving said housing through said one opening passes through said first exchanger, reversible electric motor driven fan means for forcing air into one of said openings and out the other or vice versa, and circuit control means for said electric controlled valve means and said electric motor and operative to synchronize the operations of said valve and motor whereby when said valve means is operative to direct refrigerant from the discharge of said compressor to said first exchanger said fan moves air through said one opening into and through said housing and when said valve is operated to direct refrigerant from the discharge of said compressor to said second heat exchanger and to withdraw refrigerant from said first exchanger, said fan is reversed to move the air into said housing through the other of said openings and out of said housing through said first heat exchanger and said one opening.

7. In a refrigerating system including a refrigerant compressor, first and second heat exchangers connected with said compressor in a refrigerant circuit and adapted to serve either as a condenser or evaporator, an engine for driving said compressor, electric energizable valve means to reverse the order of flow from the discharge of said compressor through said first and second heat exchangers whereby one exchanger serves as a refrigerant condenser while the other exchanger serves as a refrigerant evaporator and vice versa when said electric energizable means is energized and deenergized respectively, a housing enclosing said compressor, engine and first-mentioned heat exchanger, said housing having two spaced openings therein for providing flow of air therethrough, said first heat exchanger extending transversely of and adjacent to one of said two openings whereby substantially all air entering or leaving said housing passes through said first heat exchanger, reversible fan means for forcing air into one of said openings and out the other and vice versa, and means to control said electric energizable means and said reversible fan means in synchronism whereby air is drawn into said housing through said one opening and expelled from the housing through the other of said openings when said first exchanger functions as a condenser and for passing air into said housing through said other opening and expelling air from said said housing through said one opening when said first heat exchanger functions as an evaporator.

8. In a refrigerating system including a refrigerant compressor, first and second heat exchangers connected with said condenser in a refrigerant circuit and adapted to serve either as a condenser or evaporator, an internal combustion engine for driving said compressor, valve means to reverse the order of flow of refrigerant from the discharge of said compressor through said first and second heat exchangers whereby said first exchanger serves as a refrigerant condenser while the second exchanger serves as a refrigerant evaporator and vice versa, a housing enclosing said compressor, engine and first mentioned heat exchanger, said housing having air flow openings in two opposite walls thereof, said first heat exchanger being transversely disposed relative to one of said openings whereby substantially all air entering or leaving said housing through said one opening passes through said first exchanger, said engine including a heat dissipating radiator disposed adjacent to and substantially coextensive with said first heat exchanger and on the inside of said housing, said compressor and engine being disposed between said radiator and the other of said openings in said housing, and reversible fan means for forcing air into one of said openings and out the other, or vice versa, and means to control said valve means and said reversible fan means to cause the flow of air to enter said one opening and exit the housing through said other opening when said first exchanger functions as a condenser and to reverse the flow of air through said openings in the housing when said first heat exchanger functions as an evaporator.

References Cited in the file of this patent

UNITED STATES PATENTS

| | | |
|---|---|---|
| 360,223 | Johnson | Mar. 29, 1887 |
| 2,263,476 | Sunday | Nov. 18, 1941 |
| 2,339,903 | Alexander | Jan. 25, 1944 |
| 2,672,734 | Ditzler | Mar. 23, 1954 |
| 2,724,579 | Christiansson | Nov. 22, 1955 |

UNITED STATES PATENT OFFICE
CERTIFICATE OF CORRECTION

Patent No. 3,139,924 July 7, 1964

Earl F. Schreiner

It is hereby certified that error appears in the above numbered patent requiring correction and that the said Letters Patent should read as corrected below.

Column 4, line 67, after "compressor" insert a comma.

Signed and sealed this 1st day of December 1964.

(SEAL)
Attest:

ERNEST W. SWIDER
Attesting Officer

EDWARD J. BRENNER
Commissioner of Patents